(12) United States Patent
Harano

(10) Patent No.: US 7,386,281 B2
(45) Date of Patent: Jun. 10, 2008

(54) MOBILE WIRELESS TERMINAL

(75) Inventor: Nobuya Harano, Shizuoka (JP)

(73) Assignee: NEC Corporation, Tokyo (JP)

( * ) Notice: Subject to any disclaimer, the term of this patent is extended or adjusted under 35 U.S.C. 154(b) by 749 days.

(21) Appl. No.: 10/444,135

(22) Filed: May 23, 2003

(65) Prior Publication Data
US 2003/0224738 A1 Dec. 4, 2003

(30) Foreign Application Priority Data
May 28, 2002 (JP) ............................. 2002-154235

(51) Int. Cl.
*H04B 1/38* (2006.01)
(52) U.S. Cl. ............... 455/90.3; 455/575.1; 455/575.5; 455/575.7; 343/702; 343/895; 384/489
(58) Field of Classification Search ............. 455/575.1, 455/575.5, 90.3, 575.8; 343/895, 702, 901
See application file for complete search history.

(56) References Cited

U.S. PATENT DOCUMENTS

| 5,546,094 | A | | 8/1996 | Egashira |
| 5,777,261 | A | | 7/1998 | Katz |
| 5,801,660 | A | * | 9/1998 | Ohtsuka et al. ....... 343/700 MS |
| 5,892,483 | A | * | 4/1999 | Hayes et al. ................. 343/729 |
| 5,926,748 | A | * | 7/1999 | Yoshihara et al. ........ 455/575.7 |
| 6,031,493 | A | * | 2/2000 | Tsuda et al. ................. 343/702 |
| 6,091,369 | A | * | 7/2000 | Baek et al. ................... 343/702 |
| 6,285,340 | B1 | * | 9/2001 | Park et al. ................... 343/895 |
| 6,292,145 | B1 | * | 9/2001 | Yu ............................... 343/702 |
| 6,310,578 | B1 | * | 10/2001 | Ying .......................... 343/702 |
| 6,329,962 | B2 | * | 12/2001 | Ying .......................... 343/895 |
| 6,351,241 | B1 | * | 2/2002 | Wass .......................... 343/702 |
| 6,353,443 | B1 | * | 3/2002 | Ying .......................... 715/702 |
| 6,486,853 | B2 | * | 11/2002 | Yoshinomoto et al. ..... 343/895 |
| 6,531,986 | B2 | * | 3/2003 | Saito .......................... 343/702 |
| 6,615,026 | B1 | * | 9/2003 | Wong ...................... 455/575.5 |
| 6,642,893 | B1 | * | 11/2003 | Hebron et al. .............. 343/702 |

(Continued)

FOREIGN PATENT DOCUMENTS

EP 0 973 228 1/2000

(Continued)

OTHER PUBLICATIONS

United Kingdom Search Report dated Jun. 24, 2003.

(Continued)

*Primary Examiner*—Marceau Milord
(74) *Attorney, Agent, or Firm*—Whitham Curtis Christofferson & Cook, PC

(57) ABSTRACT

There is provided a mobile wireless terminal permitting the distance between the antenna and the human head can be kept relatively constant even if the angle formed by the case of the apparatus is varied, making it possible to ensure stable antenna performance.

A mobile wireless terminal according to the invention is fitted to an upper case and has an antenna extensible from the upper case and, when that antenna is stowed in the upper case 1, the upper end of the upper case protrudes farther than the position of an ½ length of a coil section, which is the tip section of an antenna element positioned at the tip section of the antenna.

13 Claims, 4 Drawing Sheets

U.S. PATENT DOCUMENTS

| | | | |
|---|---|---|---|
| 6,704,417 B2 * | 3/2004 | Kim | 379/433.07 |
| 6,754,507 B2 * | 6/2004 | Takagi | 455/550.1 |
| 6,754,514 B1 * | 6/2004 | Nakamura | 455/575.3 |
| 6,782,273 B2 * | 8/2004 | Ono et al. | 455/550.1 |
| 6,785,519 B2 * | 8/2004 | Toyoda et al. | 455/90.1 |
| 6,807,275 B1 * | 10/2004 | Kubo et al. | 379/433.04 |
| 6,807,276 B2 * | 10/2004 | Hirayama et al. | 379/433.07 |
| 6,876,872 B2 * | 4/2005 | Ko | 455/572 |
| 2002/0055375 A1 | 5/2002 | Kozakai et al. | |

FOREIGN PATENT DOCUMENTS

| | | |
|---|---|---|
| GB | 2 254 519 | 10/1992 |
| GB | 2 280 322 | 1/1995 |
| GB | 358 984 | 8/2001 |

OTHER PUBLICATIONS

Great Britain Office Action dated Aug. 16, 2004.

* cited by examiner

CENTER OF ROTATION
(UPPER END OF CASE)

MOBILE WIRELESS TERMINAL

BACKGROUND OF THE INVENTION

1. Field of the Invention

The present invention relates to a mobile wireless terminal having an antenna device extensible from the case of the mobile wireless terminal and, more particularly, to an improvement for preventing the antenna performance from deterioration.

2. Description of the Prior Art

A mobile wireless terminal capable of mobile communication is usually susceptible to wide fluctuations of the situation of electromagnetic waves during transit, and requires stable antenna performance in order to ensure stable wireless characteristics. Especially in communication taking place close to a human body, as the antenna is very close to the human head which is apt to inflict loss, the antenna performance may be greatly deteriorated by the human head, and in a state in which the antenna is stowed, the antenna is closer to the human head than when it is extended, and accordingly its performance is even more susceptible to deterioration by the head.

Furthermore, as the angle formed by the case of the mobile wireless terminal and the human head varies during communication, the antenna sometimes approaches and at other times moves away from the human head with a destabilizing effect on the antenna performance.

FIG. 1 and FIG. 2 show front views of a mobile wireless terminal according to the prior art in some of the ways it is used during a call. In the drawings, the conventional mobile wireless terminal is provided with an upper case 100 having a receiver section 104 and a lower case 101, and the two cases are rotatably connected by a hinge section 103. The upper case 100 accommodates an extensible antenna, which can be drawn out of the case, and its tip section 105 projects from the upper end of the upper case 100. The antenna tip section 105 has an antenna coil section inside. A tangent 120 in FIG. 1 and FIG. 2 is the tangent of contact between the upper case 100 of the mobile wireless terminal and a human face (cheek), and a line 121 is the central axis of the antenna.

According to the prior art, when the inner face (the face that is inside when the terminal is folded) of the upper case 100 is in contact with the user's cheek as shown in FIG. 1, the antenna tip section 105 is at a distance B from the human head.

However, when the case is rotated round the upper end 106 of the upper case 100 on the side in contact with the cheek and the inner face of the upper case 100 moves away from the cheek as shown in FIG. 2, the distance (D<B) between the antenna tip section 105 and the human head varies in the direction of bringing the cheek closer to the tip section of the antenna, resulting in substantial variations in the impedance characteristic and the radiation characteristic of the antenna.

SUMMARY OF THE INVENTION

An object of the present invention is to provide a mobile wireless terminal which, even if the angle between the cases of the terminal varies, can prevent the distance between the antenna and the human head from becoming shorter but keep it relatively constant and thereby ensure stable antenna performance.

A mobile wireless terminal according to the present invention is fitted to a case and has an antenna extensible from the case, wherein the upper end of the case protrudes farther than the position of an ½ length of the tip section of an antenna element positioned at the tip section of the antenna when the antenna is stowed in the case.

More specifically, the tip section of the antenna protrudes in the thickness direction from the surface of the case (the direction away from the human head).

According to the invention, the case may be configured to cover a part of the tip section of the antenna so as to protect the tip section of the antenna.

Further according to the invention, the antenna may be a multi-stepped antenna element.

BRIEF DESCRIPTION OF THE DRAWINGS

The above and other objects, features and advantages of the present will become more apparent from the following detailed description when taken in conjunction with the accompanying drawings wherein.

DESCRIPTION OF THE PREFERRED EMBODIMENTS

Next will be described in detail embodiments of the present invention with reference to accompanying drawings.

Figure 1:
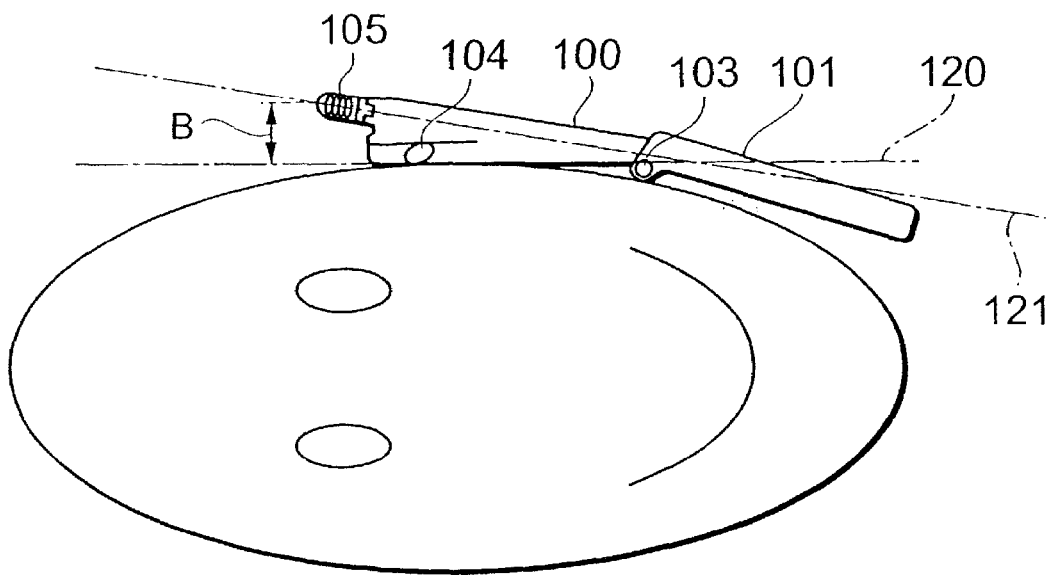
FIG. 1 shows a front view of a mobile wireless terminal according to the prior art in a way it is used during a call.
Figure 2:
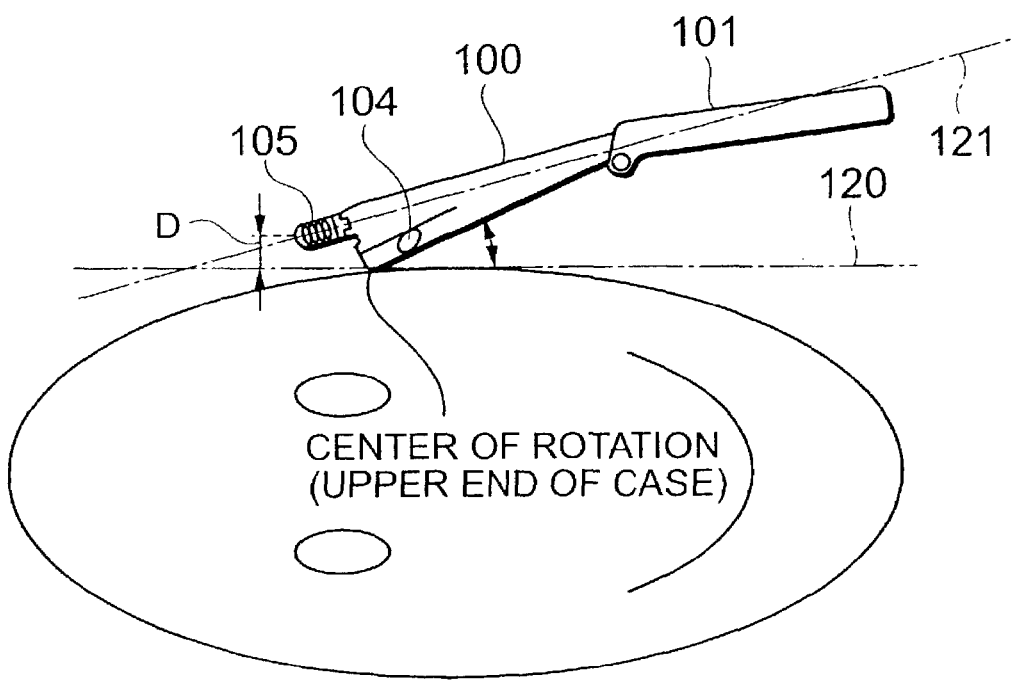
FIG. 2 shows a front view of the mobile wireless terminal according to the prior art in another way it is used during a call.
Figure 3:
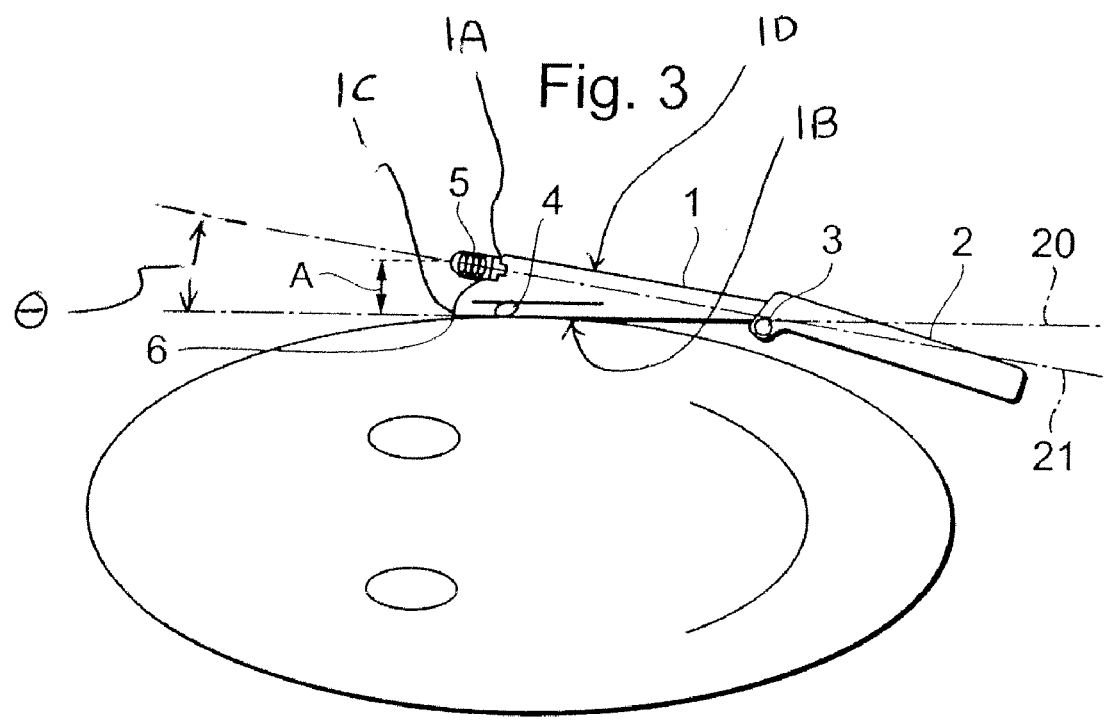
FIG. 3 shows a front view of a mobile wireless terminal, which is a first embodiment of the present invention, in a way it is used during a call.
Figure 4:
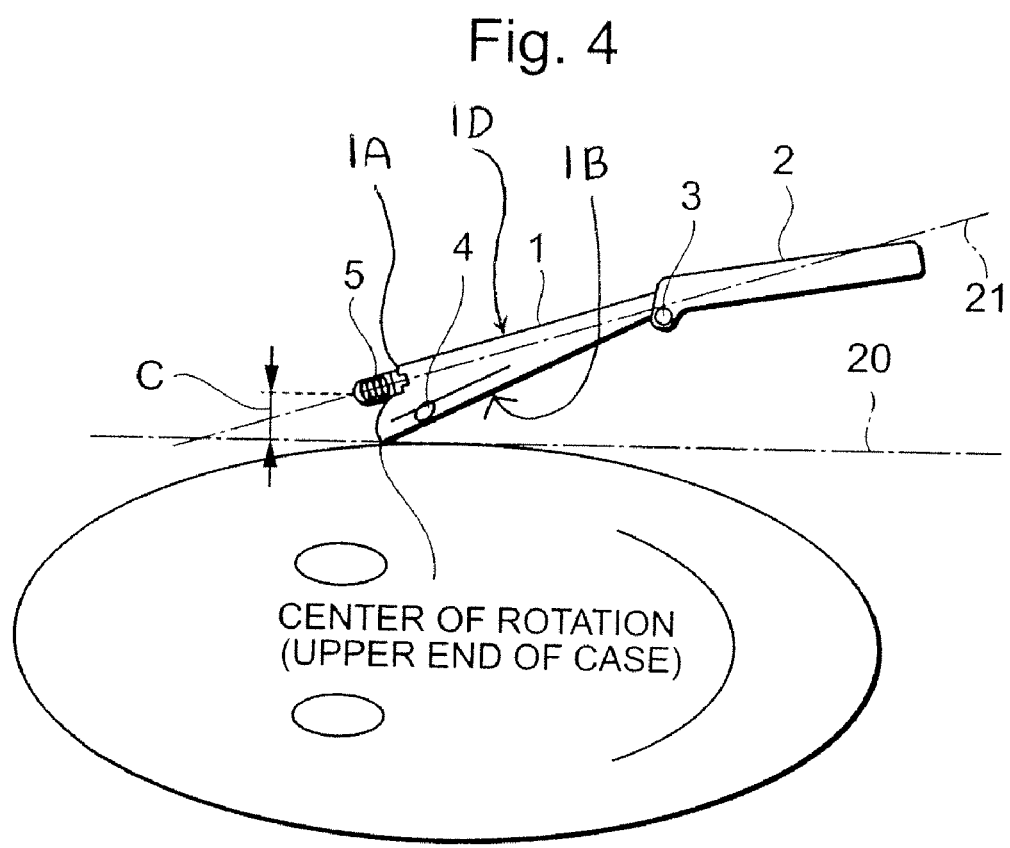
FIG. 4 shows a front view of the mobile wireless terminal, which is the first embodiment of the invention, in another way it is used during a call.

FIG. 3 and FIG. 4 show front views of a mobile wireless terminal, which is a first embodiment of the present invention, in some ways it is used during a call. Referring to the drawings, the mobile wireless terminal in this first mode of carrying out the invention has an upper case 1 having a receiver section 4 and a lower case 2, and the two cases are rotatably connected by a hinge section 3. It is more preferable for the mobile wireless terminal to be a mobile telephone terminal capable of mobile communication.

The upper case 1 accommodates an extensible antenna, which can be drawn out of the case, and its tip section 5 projects from an antenna mount surface 1A at the upper end of the upper case 1. As shown in FIGS. 3 and 4, the upper case 1 has an inner face 1B shown as contacting a human cheek. As shown in the FIG. 5 detail, the antenna protection surface 1C protrudes above the antenna mount surface 1A in the direction of the antenna tip 5, and adjoins an upper end 6 of the inner face 1B. A back surface 1D is spaced from the inner face 1B. The antenna tip section 5 has an antenna element tip section 5A (or helical coil section 5A; hereinafter referred to simply as the coil section) inside. A tangent 20 in FIG. 3 and FIG. 4 is the tangent of a contact between the inner face 1B of the upper case 1 of the mobile wireless terminal and a human face (cheek) when aligned substantially flat against the human face, and a line 21 is the central axis of the antenna tip section 5 and shaft (not shown in FIGS. 3 and 4). In the drawings, the tangent 20 and antenna central axis 21 form a prescribed angle θ. The tip section 5 has a distal end 5B centered along the central axis of the antenna.

The antenna element tip section need not be a coil section, but may have any other shape if only it allows the antenna to function satisfactorily.

Figure 5:
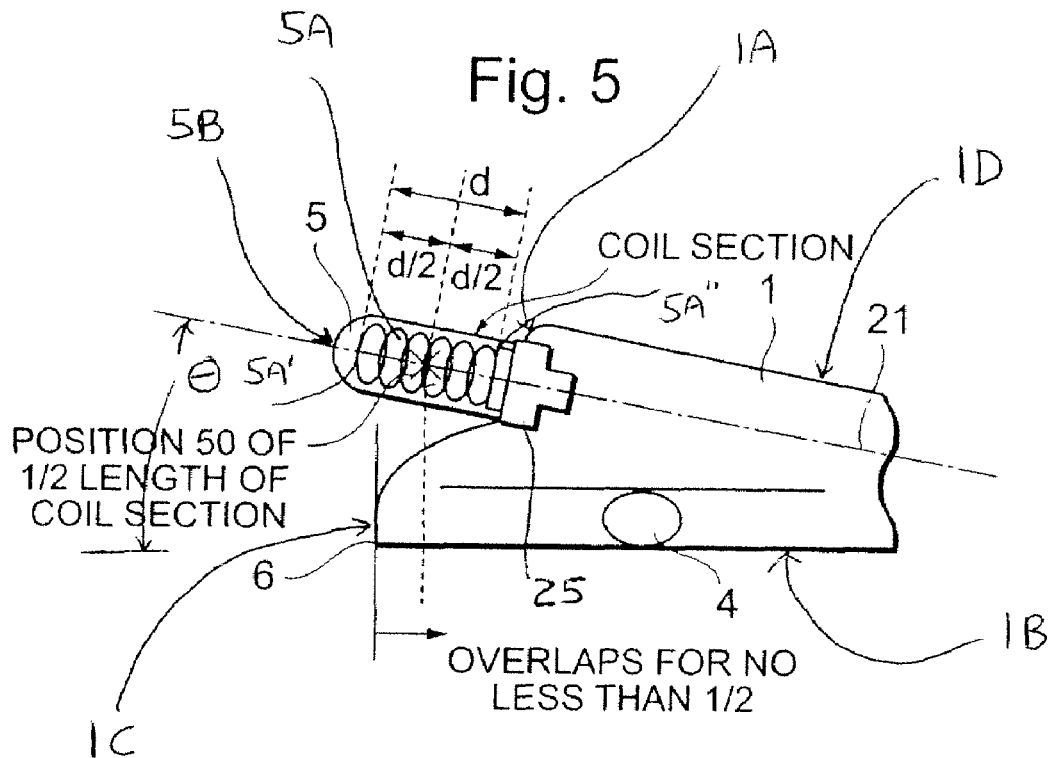
FIG. 5 shows an enlarged view of the antenna tip section and the upper case of the mobile wireless terminal shown in FIG. 3.

FIG. 5 shows an enlarged view of the antenna tip section 5, the coil section 5A and the upper end 6 of the upper case 1 of the mobile wireless terminal shown in FIG. 3. The coil section 5A has a base 5A' and a terminal end 5A'', and the base 5A' is shown abutting an antenna support 25 arranged in the antenna mount surface 1A. Unlike the antenna tip section according to the prior art, which including the coil section projects from the upper end of the case, in this embodiment of the invention a large part of the antenna tip section 5 is in a lower position than the upper end 6 of the upper case 1 (a position of the contracting direction of the antenna along with the antenna central axis 21, i.e., a position toward the hinge section 3). More specifically, the center 50 of the coil section 5A inside the antenna tip section 5 (a position equal in length to of a length of the coil section 5A in FIG. 5) is in a lower position that the upper end 6 of the upper case 1. Thus, the upper case including the upper end 6 overlaps the antenna tip section 5 for a length no less than ½ of the length of its coil section 5A. In other words, the upper end 6 protrudes. further out than the coil section center 50.

If, here, the upper end 6 of the upper case 1 were at the same level or in a lower position than the coil section center 50 of the antenna tip section 5, when the mobile wireless terminal is rotated round the upper end 6 of the upper case 1, the coil section would approach the human head.

However, since the coil section center 50 of the antenna tip section 5 (FIG. 5) is in a lower position than the upper end 6 of the upper case 1 in this embodiment of the invention, when the mobile wireless terminal is rotated round the upper end 6 of the upper case 1 as shown in FIG. 4, the coil section moves away from the human head until it comes to the same position as the upper end 6.

It has to be noted, though, that the distance between the human head and the coil section center varies relatively little when the coil section center 50 is in the vicinity of the upper end 6.

In the first embodiment of the invention described above, the distance between the antenna tip section and the human head varies relatively little depending on whether the upper case 1 is in contact with (FIG. 3) or not in contact with (FIG. 4) the cheek, and variations in the impedance characteristic and the radiation characteristic of the antenna are accordingly small.

Referring to FIGS. 3 and 4, when the inner face 1B of the upper case 1 is rotated from the FIG. 3 depicted state in which it is in close contact with the cheek FIG. 3. to a state in which it is away from the cheek as shown in FIG. 4 with the receiver section being in contact with the ear, the distal end 5B of the antenna tip section 5 also rotates about the upper end 6, which is the center of rotation, but since the distal end 5B of the antenna tip section 5 is close to the center of rotation at 6, the distance between the distal end 5B and the human head (a distance shown as A in FIG. 3 or distance C shown in FIG. 4) does not substantially vary.

Figure 6:
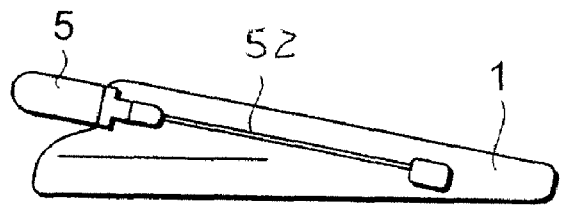
FIG. 6 shows a profile of the mobile wireless terminal, which is the first embodiment of the invention, in a state in which its one-step extensible antenna element is contracted.
Figure 7:
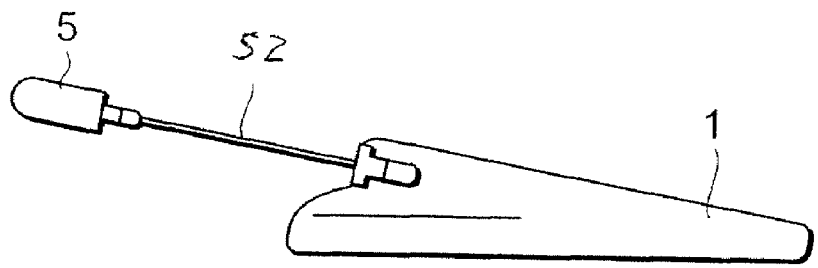
FIG. 7 shows a profile of the mobile wireless terminal, which is the first embodiment of the invention, in a state in which its one-step extensible antenna element is extended.
Figure 8:
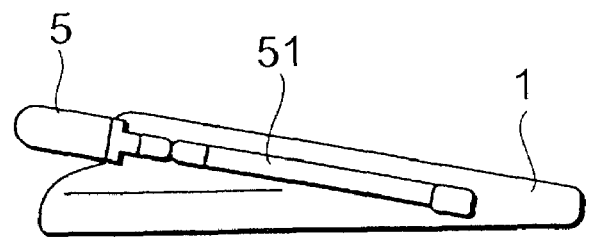
FIG. 8 shows a profile of a mobile wireless terminal, which is a second embodiment of the invention, in a state in which its two-step extensible antenna element is contracted.
Figure 9:
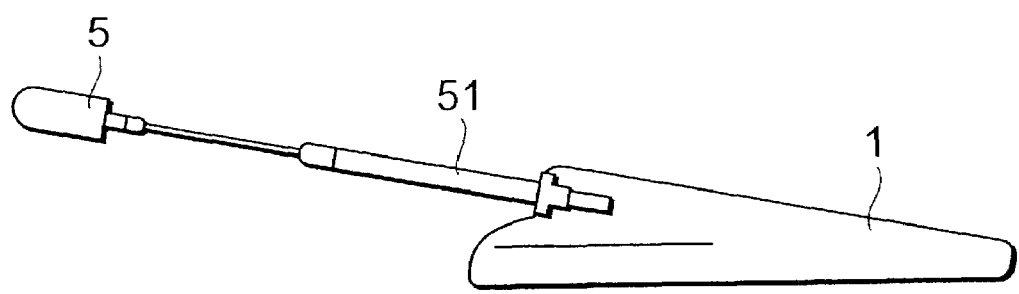
FIG. 9 shows a profile of the mobile wireless terminal, which is the second embodiment of the invention, in a state in which its two-step extensible antenna element is extended.

FIG. 6 and FIG. 7 show profiles of the mobile wireless terminal, which is the first embodiment of the invention, in a state in which its one-step extensible antenna element 52 is stowed and extended, respectively. FIGS. 8 and 9 show profiles of a mobile wireless terminal, which is a second embodiment of the invention, in a state in which its two-step extensible antenna element 51 is stowed and extended, respectively. Illustration of the hinge section and the lower case is dispensed with in FIG. 6 through FIG. 9, though.

The first embodiment of the invention (FIG. 6 and FIG. 7) uses a one-step extensible antenna element 50. The second embodiment of the invention uses an antenna element extensible in two steps in order to improve the antenna performance at the human head when an antenna element 51 is extended. This second embodiment is the same in other respects as in FIG. 3 through FIG. 5.

If the coil section of the antenna element is so arranged as to overlap the upper case 1 for a length of not less than ½ of its length, the length of the antenna element that can be secured within the case when the antenna is stowed will become shorter than according to the prior art. The resultant shortening of the antenna element would deteriorate the antenna performance at the human head when the antenna is extended.

To prevent this deterioration, satisfactory antenna performance in an extended state of the antenna is realized by using the antenna element 51 which is extensible in two steps as shown in FIGS. 8 and 7 and thereby securing a comparable antenna element length to that according to the prior art.

Figure 10:
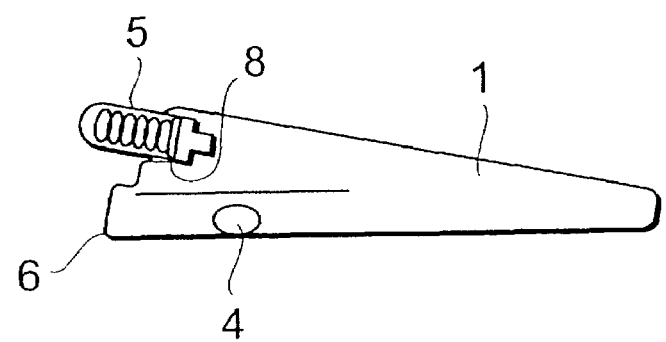
FIG. 10 shows a partial front view of a mobile wireless terminal, which is a third embodiment of the invention.

FIG. 10 shows a front view of a mobile wireless terminal, which is a third embodiment of the invention. Illustration of the hinge section and the lower case is dispensed with in FIG. 10, though.

This embodiment of the invention has a recess 8 which surrounds a part of the antenna tip section 5 when the antenna is stowed as it is in the first embodiment, and the upper case 1 covers a part of the antenna tip section 5 so as to protect it. To add, the center of the coil section (corresponding to the ½ length position 50 of the length d of the coil section in FIG. 5) within the antenna tip section 5 is in a lower position than the upper end 6 of the upper case 1. Thus, the upper case 1 including the upper end 6 overlaps the coil section of the antenna tip section 5 for a length not less than ½ of its length. In other words, the tip section 6 protrudes from the coil section center 50.

The third embodiment provides an advantage that any damage that may be inflicted on the antenna by an impact working on its tip section in a stowed state can be reduced in addition to the advantages of the first embodiment.

According to the invention, the connection between the antenna and the circuit board of the radio section (not shown) of the mobile wireless terminal can be facilitated by using pin probes as terminals for connecting the antenna and the circuit board so that the terminals come into vertical contact from a circuit substrate of the radio section.

As hitherto described, the mobile wireless terminal according to the present invention, since the upper end of its case projects farther than the ½ length position of the antenna element tip section built into the antenna tip section, the distance between the antenna and the human head can be kept relatively constant even if the angle formed between the case and the human head is varied when the wireless terminal is being used at the human head, making it possible to ensure stable antenna performance.

Furthermore, as the antenna protrudes relatively little from the upper end of the antenna element tip section when the antenna is stowed, there is an additional advantage that antenna performance is prevented from being deteriorated by contact between the antenna tip section and the user's ear.

While this invention has been described in connection with certain preferred embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

What is claimed is:

1. A mobile wireless terminal apparatus comprising:
    a case having an inner face, a back surface spaced apart from the inner face, and a top end surface extending between a top of the inner face and a top of the back surface, the top end surface having an antenna mount surface and an antenna protection surface; and
    an antenna coil having a coil base, a coil distal end spaced a length D above the coil base in an extension direction, the coil having a coil center located D/2 in the extension direction above the coil base, at least a portion of coil arranged above an area of the antenna mount surface,
    wherein the antenna coil and the antenna protection surface are arranged such that the antenna protection surface protrudes above the coil center in the extending direction.

2. The mobile wireless of terminal of claim 1, wherein an area of the antenna protection surface adjoining the top surface of the inner face forms a contact surface for contacting a human head proximal to an ear while rotating the case, with the contact surface being the center of the rotation, from a position where the inner face contacts with the human head proximal to a cheek to a position where the inner face is spaced away from the cheek, during a normal operation of the mobile wireless terminal.

3. The mobile wireless terminal of claim 2, wherein the extending direction forms an angle with respect to the inner face so as to extend, in part, away from a human head during a normal operation of the mobile wireless terminal.

4. The mobile wireless terminal of claim 2,
    wherein the case includes first case and a second case connected to an end of the first case opposite the top end surface,
    wherein the first case has structure forming the inner face, the back surface and the top end surface having the antenna mount surface and the antenna protection surface, and
    wherein the first case and the second case are manually movable, about the hinge, between a folded position and an open position.

5. The mobile wireless terminal of claim 2, wherein the case forms an interior, further comprising a receiver unit arranged within the interior and connected to the antenna.

6. The mobile wireless terminal of claim 1, further comprising an antenna shaft connected to the antenna coil and extending through an area of the antenna mount surface of the case, wherein the antenna shaft is extendable from a stowed position to an extended position, and wherein the coil center is below the antenna protection surface, in the extending direction, when the antenna is in the stowed position and above the antenna protection surface in the extending direction when the antenna is in the extended position.

7. The mobile wireless terminal of claim 6,
    wherein the case includes first case and a second case connected to an end of the first case opposite the top end surface,
    wherein the first case has structure forming the inner face, the back surface and the top end surface having the antenna mount surface and the antenna protection surface, and
    wherein the first case and the second case are manually movable, about the hinge, between a folded position and an open position.

8. The mobile wireless terminal of claim 6, wherein the antenna mount surface of the top end of the case includes a recess, and wherein the antenna coil and the recess are arrange wherein a portion of the coil is within the recess when the antenna is in the stowed position.

9. The mobile wireless terminal of claim 8, wherein the antenna and the recess are structured such that extending the antenna to the extended position spaces the base of the coil above the recess, in the extending direction.

10. The mobile wireless terminal of claim 6, wherein the case forms an interior, further comprising a receiver unit arranged within the interior and connected to the antenna.

11. The mobile wireless terminal of claim 1,
    wherein the case includes first case and a second case connected to an end of the first case opposite the top end surface,
    wherein the first case has structure forming the inner face, the back surface and the top end surface having the antenna mount surface and the antenna protection surface, and
    wherein the first case and the second case are manually movable, about the hinge, between a folded position and an open position.

12. The mobile wireless terminal of claim 11, wherein the first case forms an interior, further comprising a receiver unit arranged within the first case and connected to the antenna.

13. The mobile wireless terminal of claim 1, wherein the case forms an interior, further comprising a receiver unit arranged within the interior and connected to the antenna.

* * * * *